Dec. 5, 1950   C. W. COCHRAN, JR   2,532,290
COMPOUND INDICATING INSTRUMENT
Filed Dec. 29, 1945   2 Sheets-Sheet 1

INVENTOR.
CHARLES W. COCHRAN JR.
BY M. O. Hayes
ATTORNEY.

Dec. 5, 1950 C. W. COCHRAN, JR 2,532,290
COMPOUND INDICATING INSTRUMENT
Filed Dec. 29, 1945 2 Sheets-Sheet 2

*INVENTOR.*
CHARLES W. COCHRAN JR.
BY *M. O. Hayes*
ATTORNEY.

Patented Dec. 5, 1950

2,532,290

UNITED STATES PATENT OFFICE 2,532,290

COMPOUND INDICATING INSTRUMENT

Charles W. Cochran, Jr., United States Navy,
Yeadon, Pa.

Application December 29, 1945, Serial No. 637,811

3 Claims. (Cl. 235—61)

(Granted under the act of March 3, 1883, as
amended April 30, 1928; 370 O. G. 757)

This invention relates to new and useful improvements in indicating instruments and more particularly to compound instruments, showing both separate and compound indications.

The known types of compound instruments existing prior to the present invention are extremely intricate and delicate and therefore difficult to manufacture and to keep in correct adjustment. Furthermore, existing compound instruments do not have provisions for separately indicating each individual variable.

The existing compound instruments are limited as to number of variables considered and also are restricted to only the most simple mathematical equations. Furthermore, these existing compound instruments cannot be adjusted from one mathematical equation to another, but are restricted to only one operation.

One object of this invention is to provide a compound indicating instrument which operates with any required number of independent variables and indicates any desired combination of these variables.

Another object of this invention is to provide a compound instrument having few moving parts so constructed that they may be easily manufactured and assembled.

Another object of this invention is to provide a compound instrument which indicates each individual variable in addition to any required mathematical combination of all the co-acting variables.

Still another object of this invention is to provide a simple, rugged and efficient compound instrument that is easily adjusted and adapted to follow any mathematical equation with any number of variables.

A further object of this invention is to provide a universal compound instrument that may be adjusted from one mathematical equation to any other mathematical equation.

A still further object of this invention is to provide a compound instrument that is adaptable for remote indication.

These and other inherent objects of this invention, or any combination thereof, and the various features and details of the design, construction and operation thereof, are hereinafter more fully set forth and described with reference to the accompanying drawings which form part of the instant specification and are to be read in conjunction therewith and in which like reference numerals are used to indicate like parts in the various views.

For purpose of convenience and by way of illustration, but not for limitation, this compound instrument will be described as a horsepower instrument, though it is to be understood that it may be used for fuel-air ratio, true air speed, mach number, orifice flow and the like measurement. It will be further understood that, while the invention described is a compound instrument, it can be used also as a recording or a control instrument.

Figure 1:
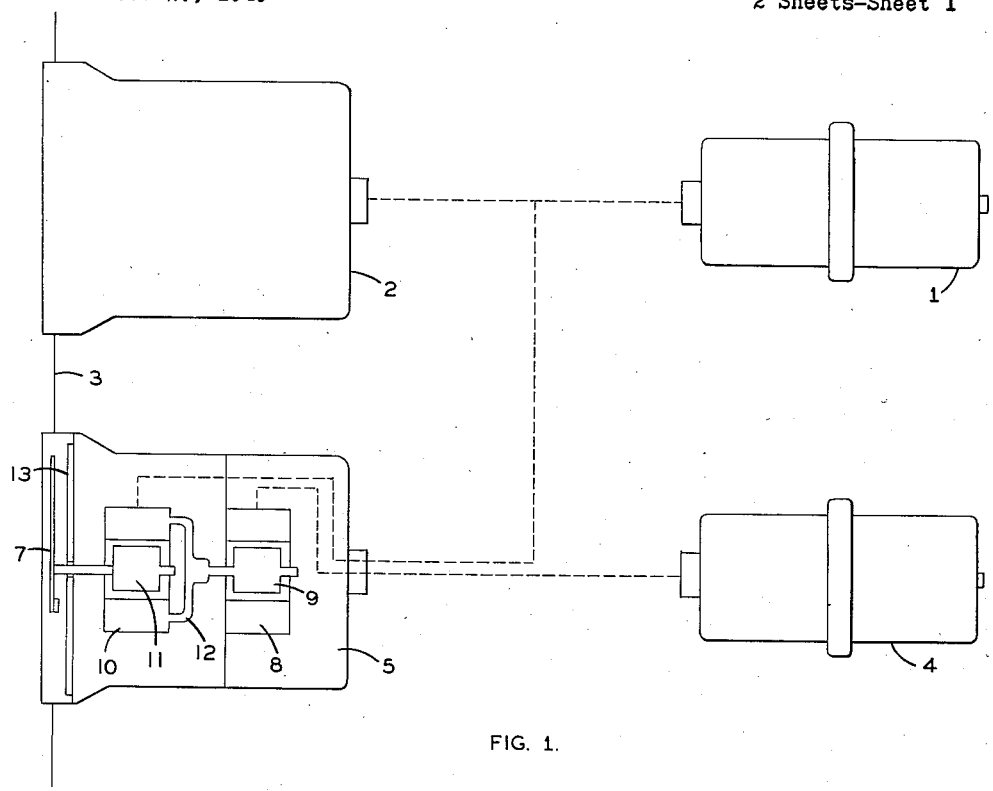
Fig. 1 is a schematic diagram of one embodiment of this invention.

Referring now to the drawings, and more particularly to Fig. 1 thereof, which shows a compound instrument for measuring and indicating the horsepower of an aircraft engine and embodying the present invention, comprising an engine speed sensing unit 1, an engine speed indicator 2 for separately indicating the engine speed on the operator's instrument panel 3, a torque sensing unit 4 and a compound horsepower indicator 5.

Figure 2:
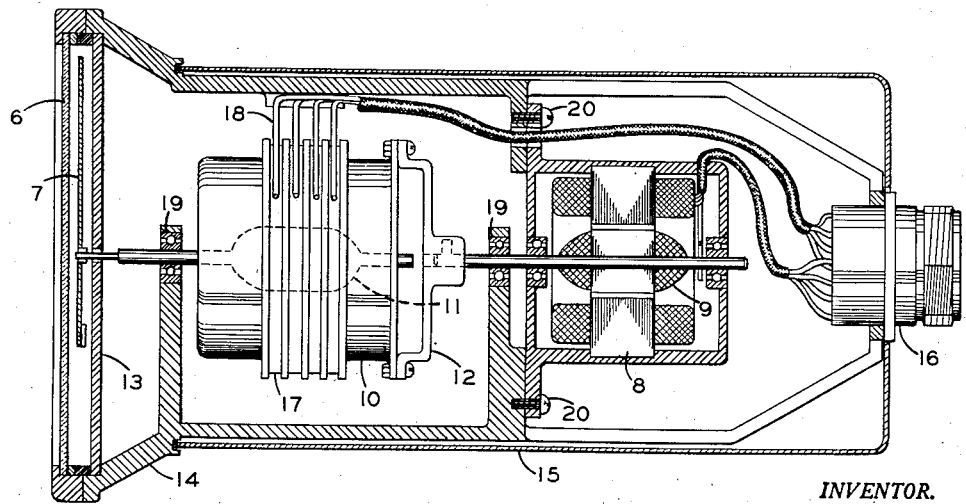
Fig. 2 is a sectional view of a typical indicator unit.

Referring now to Fig. 2 it will be seen that the compound indicating unit 5 is composed of a number of receiving elements so arranged as to algebraically add the movements of the sensing units. As a means of illustrating this invention, remotely indicating autosyn units are used to algebraically add the movements of the sensing elements, however, it is to be understood that any other suitable means such as Selsyn, magnasyn, electrical resistances and the like may be employed for computing purposes.

The compound indicator frame 14 supports the dial 13, cover glass 6, bearings 19, cover case 15 and electrical connector 16. The field windings 8 of the rear autosyn receiving unit are secured to the instrument frame 14 by means of the screws 20. The rear autosyn rotor 9 is secured to the field winding 10 of the front autosyn by means of the coupling 12. The rotor 11 of the front autosyn is secured to the dial indicating hand 7. Electrical contact is made with the rotatable field windings 10 through slip rings 17 and brushes 18.

The rotor 11 of the front autosyn may be caused to rotate in either direction with respect to the field winding 10 by reversing any two field winding connections thus adding or subtracting the movement of the front autosyn from the movement of the rear autosyn.

Figure 3:
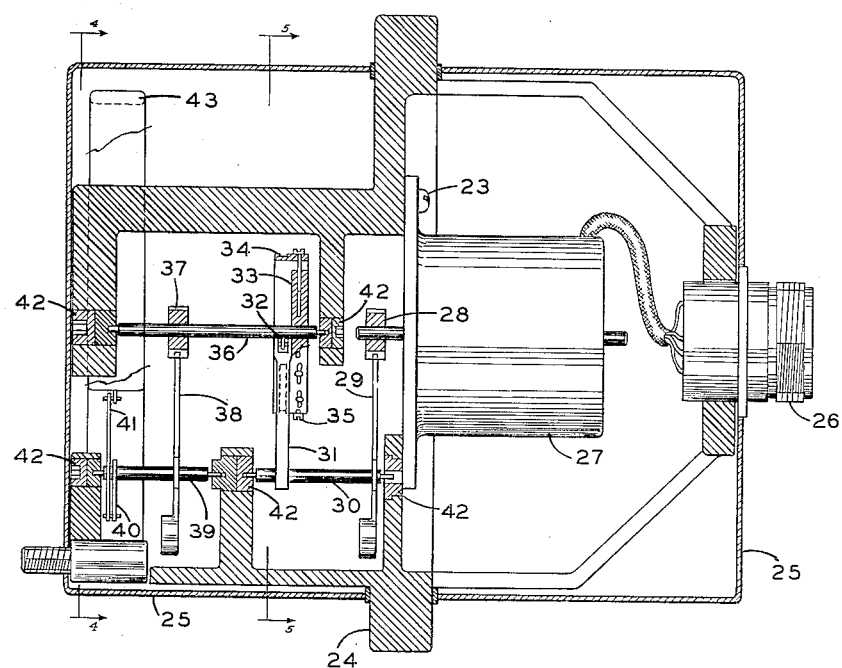
Fig. 3 is a sectional view of a typical transmitter unit.

Referring now to Fig. 3 it will be seen that the torque pressure sensing unit frame 24 supports the cover cases 25, bearings 42 and electrical plug connection 26. The autosyn transmitter unit 27 is secured to the frame 24 by means of machine screws 23.

Figure 4:
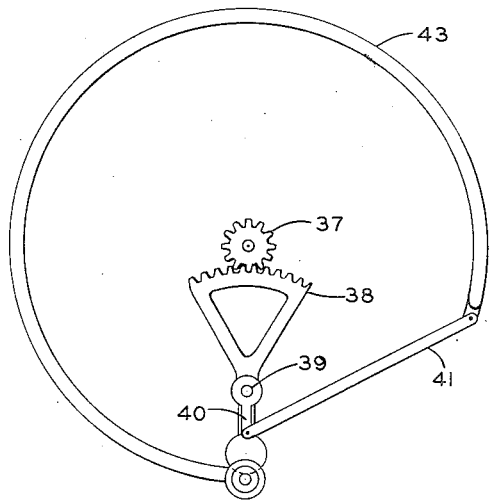
Fig. 4 is a fragmentary view of a detail taken on the line 4—4 of Fig. 3.

Referring now to Fig. 4 the sensing element 43 is actuated by variations in the variable being measured and the movement of the sensing element 43 is amplified and transmitted to the variable cam 34 through linkage 41 and 40, shaft 39, sector 38, pinion 37, shaft 36, cam base support 33 and cam adjusting screws 35. It will be readily apparent that the rotation of the variable cam 34 is proportional to the movement of the sensing element 43. Fig. 4 shows a fragmentary view of a detail taken on the line 4—4 of Fig. 3 and clearly shows linkage and amplification details.

Figure 5:
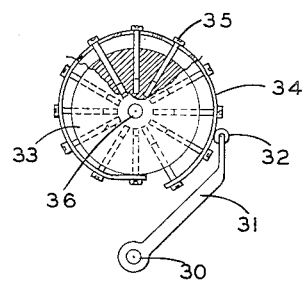
Fig. 5 is a fragmentary view of a detail taken on the line 5—5 of Fig. 3.

Referring now to Fig. 5 it can be seen that cam adjusting screws 35 screw radially, through slots in the variable cam 34, into the cam base support 33 which is secured to the shaft 36. The rotation of the shaft 36 is transmitted through cam base support 33, cam adjusting screws 35, adjustable cam 34, cam follower roller 32, and the cam follower arm 31 to the shaft 30. The adjustable cam 34 can be adjusted by means of the cam adjusting screws 35 so that the movement of the shaft 30 is proportional to any desired logarithmic function of the variable being measured. Thus it will be readily apparent that with sensing units which transmit movements proportional to a logarithmic function of the variable being measured and with a compound receiver which algebraically adds these movements and indicates them against a suitable scale that various variables may be multiplied, divided, raised to any desired power, multiplied by any desired constant and the like.

Referring again now to Fig. 3, the logarithmic movement of shaft 39 is amplified and transmitted through sector 29 and pinion 28 to the autosyn transmitter 27.

Referring again now to Fig. 1, the operation of a compound horsepower instrument is as follows:

The engine torque transmitter sensing unit 4 is actuated by the engine torque and the unit transmits a movement proportional to the logarithm of the engine torque. This movement is received by the rear autosyn receiving unit in the compound indicator 5. Thus the rotor 9 is rotated from its zero position to a new position a distance proportional to the logarithm of the engine torque. Since rotor 9 is secured through coupling 12 to the field winding 10 of the front autosyn, the field winding 10 is now advanced a distance proportional to the engine torque.

The engine speed transmitter sensing unit 1, operating on the same principle as the torque sensing unit 4, transmits a movement proportional to the logarithm of the engine speed. This movement is received by the front autosyn receiving unit in the compound indicator 5 and the individual engine speed indicator 2. Thus the rotor 11 is rotated from its zero position to a second position a distance proportional to the logarithm of the engine torque plus a distance proportional to the logarithm of the engine speed. It will be apparent, therefore, that the dial indicating hand 7 has been rotated a distance proportional to the logarithm of the product of the engine torque multiplied by the engine speed which is the engine horsepower and may be read directly upon a suitable scale.

It will be seen that by these means the object of this invention has been accomplished and there has been provided a compound instrument of simple and rugged construction in which the disadvantages of prior art are eliminated. This compound instrument is composed of few parts and these are easy to procure or manufacture. Here is provided a compound instrument that will follow any mathematical equation with any number of variables, will separately indicate each variable, is easily adjusted in the field and which may provide remote indications.

It will be understood that certain features and subcombinations are of utility and may be employed without reference to the other features and subcombinations. This is contemplated by and is within the scope of the claims. It is further obvious that various changes may be made in detail within the scope of the claims without departing from the spirit of this invention. It is, therefore, to be understood that this invention is not to be limited to the specific details shown and described, consequently, changes, modifications and other combinations may be made therein and thereto within the scope of the claims.

The invention described herein may be manufactured and used by or for the government of the United States of America for governmental purposes without the payment of any royalties thereon or therefor.

I claim:

1. A compound indicating instrument comprising in combination a plurality of sensing units each having an autosyn transmitter unit adapted to transmit a logarithmic function of a sensed indication, and a remote receiver device comprising a plurality of autosyn receiver units each having a field winding and a rotor and each connected to one of said autosyn transmitter units and having the rotor of one of said receiver units drivably connected to the field winding of a second of said receiver units whereby the output indication of said second receiver is the arithmetical computation of the indications of both said receivers.

2. A compound indicating instrument comprising in combination a plurality of sensing units, each having a transmitter unit adapted to transmit a logarithmic function of a sensed indication, and a remote receiver comprising a plurality of indicators each connected to one of said transmitter units and having the output of one indicator drivably secured to the normally stationary body of a second indicator whereby the output indication of said second indicator is the arithmetical computation of the sensed indications.

3. A compound indicating instrument comprising in combination a pair of sensing units each having an autosyn transmitter unit adapted to transmit a logarithmic function of a sensed indication, and a remote receiver device comprising a pair of autosyn receiver units each having a field winding secured in a frame and a rotor and shaft associated therewith, the shaft of the rotor of one of said pair of said autosyn receiver units drivably secured to the frame of the second of said pair of autosyn receiver units whereby the output indication of the second of said pair of autosyn receiver units indicates either the total of or the difference between the logarithmic functions of the sensed indications transmitted by said pair of autosyn transmitter units.

CHARLES W. COCHRAN, Jr.

REFERENCES CITED

The following references are of record in the file of this patent:

UNITED STATES PATENTS

| Number | Name | Date |
|---|---|---|
| 635,880 | Thomson | Oct. 31, 1899 |
| 1,162,475 | Gibson | Nov. 30, 1915 |
| 1,406,235 | Smith | Feb. 14, 1922 |
| 1,573,850 | Naiman | Feb. 23, 1926 |
| 1,655,244 | Rowell | Jan. 3, 1928 |
| 1,732,987 | Rowell | Oct. 22, 1929 |
| 1,746,130 | Ruhling | Feb. 4, 1930 |
| 1,889,876 | Pellerin et al. | Dec. 6, 1932 |
| 1,895,347 | Solomon et al. | Jan. 24, 1933 |
| 1,971,238 | Silling | Aug. 21, 1934 |
| 2,222,551 | Ziebolz et al. | Nov. 19, 1940 |
| 2,244,369 | Martin | June 3, 1941 |
| 2,277,285 | Woodling | Mar. 24, 1942 |
| 2,395,042 | Flatt | Feb. 19, 1946 |

FOREIGN PATENTS

| Number | Country | Date |
|---|---|---|
| 482,660 | Germany | Sept. 20, 1929 |